United States Patent
Wong et al.

(10) Patent No.: US 7,782,036 B1
(45) Date of Patent: Aug. 24, 2010

(54) ADAPTIVE ON-TIME CONTROL FOR SWITCHING REGULATORS

(75) Inventors: Lik-Kin Wong, Tai Po (HK); Tze-Kau Man, Yuen Long (HK)

(73) Assignee: National Semiconductor Corporation, Santa Clara, CA (US)

( * ) Notice: Subject to any disclaimer, the term of this patent is extended or adjusted under 35 U.S.C. 154(b) by 115 days.

(21) Appl. No.: 11/970,144

(22) Filed: Jan. 7, 2008

(51) Int. Cl.
*G05F 1/575* (2006.01)
(52) U.S. Cl. ..................................... 323/282
(58) Field of Classification Search ................ 323/282, 323/284, 285, 351
See application file for complete search history.

(56) References Cited

U.S. PATENT DOCUMENTS

| | | | |
|---|---|---|---|
| 4,929,882 | A | 5/1990 | Szepesi |
| 5,264,780 | A | 11/1993 | Bruer et al. |
| 5,345,165 | A | 9/1994 | Froeschle |
| 6,147,478 | A | 11/2000 | Skelton et al. |
| 6,285,174 | B1 | 9/2001 | Suzuki et al. |
| 6,348,780 | B1 | 2/2002 | Grant |
| 6,396,251 | B2 | 5/2002 | Corva et al. |
| 6,628,109 | B2 | 9/2003 | Rincon-Mora |
| 6,885,175 | B2 | 4/2005 | Mihalka |
| 7,157,943 | B2 * | 1/2007 | Sanzo .................. 327/44 |
| 7,268,526 | B1 * | 9/2007 | Smith .................. 323/285 |

OTHER PUBLICATIONS

Betten, John, "Reduce EMI by Sweeping a Power Supply's Frequency," EDN, May 27, 2004, 2 pages, www.edn.com.
Keskar, N. et al., "Self-Stabilizing, Integrated, Hysteretic Boost DC-DC Converter," The 30th Annual Conference of the IEEE Industrial Electronics Society, Nov. 2-6, 2004, pp. 586-591.
Castilla, M. et al., "Design of Voltage-Mode Hysteretic Controllers for Synchronous Buck Converters Supplying Microprocessor Loads," IEEE Proc.-Electr. Power Appl., vol. 152, No. 5, Sep. 2005, pp. 1171-1178.
Nabeshima, Takashi et al., "A Novel Control Method of Boost and Buck-Boost Converters with a Hysteretic PWM Controller," 2005, 6 pages.
Spangler, James J. et al., "A Comparison Between Hysteretic and Fixed Frequency Boost Converters Used for Power Factor Correction," IEEE, 1993, pp. 281-286.

(Continued)

*Primary Examiner*—Gary L Laxton
(74) *Attorney, Agent, or Firm*—Frommer Lawrence & Haug LLP; Matthew M. Gaffney

(57) ABSTRACT

The invention relates to a method and an apparatus for maintaining a substantially constant switching frequency in a relatively fast transient response switching regulator. The apparatus includes a comparison circuit, a one-shot circuit, and a pulse duration controller. The comparison circuit provides a comparison signal to the one-shot circuit based on a comparison of a feedback signal and a reference signal. The one-shot circuit provides a configured duration switch control pulse when the comparison signal is asserted. The pulse duration controller controls the configured duration of the switch control pulse (e.g., duration of a pulse on-time or off-time) to affect the switching frequency of the regulator. In addition, frequency jittering and frequency scaling circuitry may be included.

19 Claims, 6 Drawing Sheets

OTHER PUBLICATIONS

Yang, X. et al., "A Novel Quasi-Constant Frequency Hysteretic Current Mode Control Approach," IEEE, 2003, pp. 1147-1150.

Sahu, Biranchinath "An Accurate, Low-Voltage, CMOS Switching Power Supply With Adaptive On-Time Pulse-Frequency Modulation (PFM) Control," IEEE Transactions on Circuits and Systems-I: Regular Papers, vol. 54, No. 2, Feb. 2007, pp. 312-321.

Suntio, Teuvo, "Small-Signal Modeling of Switched-Mode Converters under Direct-On-Time Control—A Unified Approach," IEEE, 2002, pp. 479-484.

Duan, Xiaoming et al., "Current-Mode Variable-Frequency Control Architecture for High-Current Low-Voltage DC-DC Converters," IEEE Transactions on Power Electronics, vol. 21, No. 4, Jul. 2006, pp. 1133-1137.

* cited by examiner ns attached

ADAPTIVE ON-TIME CONTROL FOR SWITCHING REGULATORS

TECHNICAL FIELD

The invention is generally directed to the area of power regulation. The invention is directed, particularly, but not exclusively to maintaining a substantially constant switching frequency in a relatively fast transient response switching regulator.

BACKGROUND

Switching regulators are typically employed to provide a substantially constant output voltage or output current over a range of input voltages, disturbances, output load changes, and/or the like. Commonly, switching regulators employ feedback to compare an output voltage, output current, inductor current, switch-node current, switch-node voltage, and/or other signals, to a reference signal. The closed-loop feedback system of switching regulators enables relatively high efficiency power regulation.

Pulse frequency modulation (PFM), pulse width modulation (PWM), and/or the like, may be employed to control switching regulators. PFM switching regulators are generally associated with relatively fast transient response and a variable switching frequency. PWM switching regulators are generally associated with a relatively constant switching frequency. Both PFM and PWM switching regulators may generate electromagnetic interference (EMI) and/or other switching noise at the switching frequency and/or at harmonics thereof.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
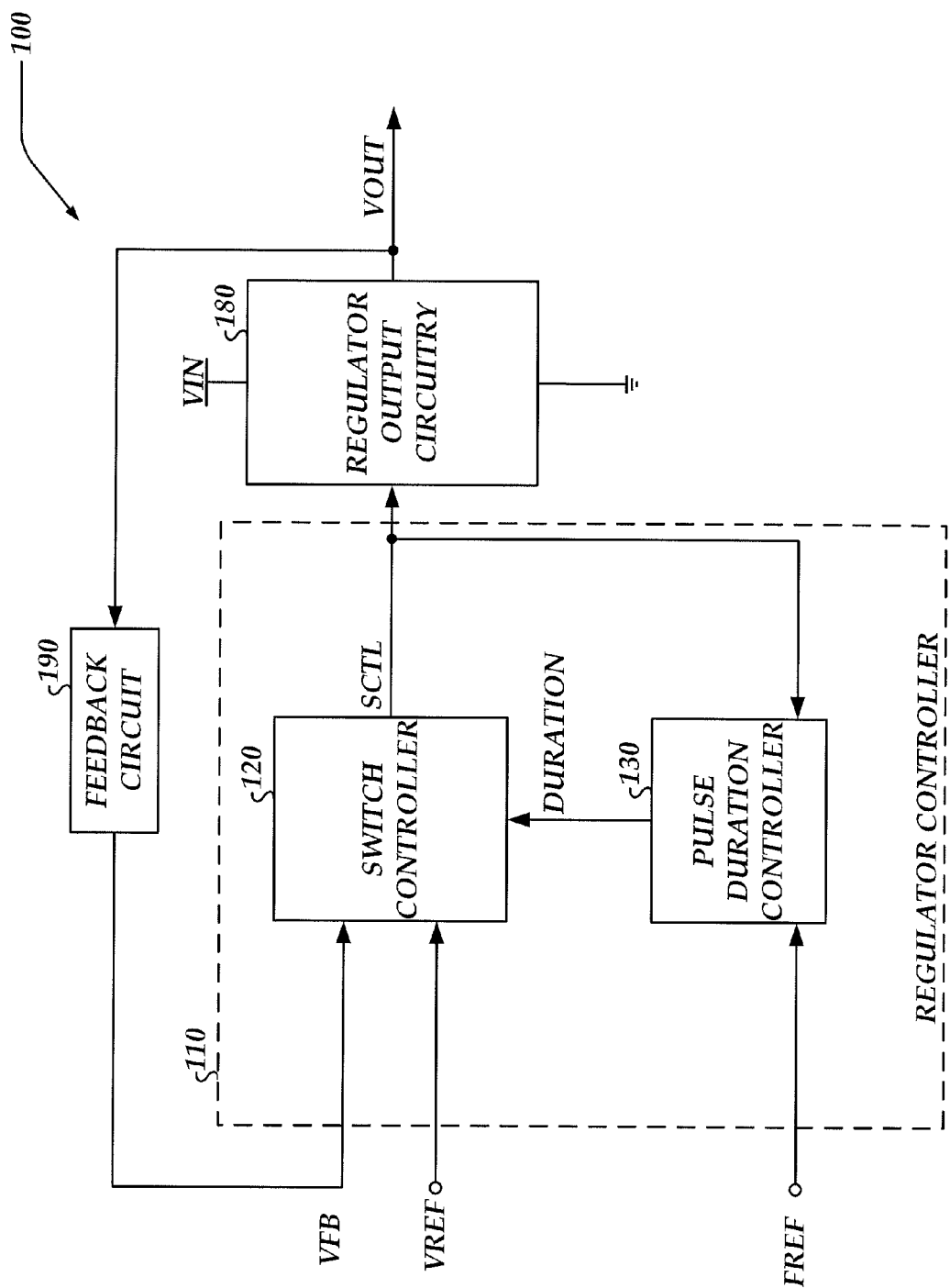
FIG. 1 is a block diagram of an embodiment of a regulator according to aspects of the present invention.

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part, on" and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. A "signal" may also be employed to provide and/or transmit power. Where either a field effect transistor (FET) or a bipolar transistor may be employed as an embodiment of a transistor, the scope of the words "gate", "drain", and "source" includes "base", "collector", and "emitter", respectively, and vice versa. The phrase "in one embodiment," as used herein does not necessarily refer to the same embodiment, although it may.

Briefly stated, the invention relates to a method and an apparatus for maintaining a substantially constant switching frequency in a relatively fast transient response switching regulator. The apparatus includes a comparison circuit, a one-shot circuit, and a pulse duration controller. The comparison circuit provides a comparison signal to the one-shot circuit based on a comparison of a feedback signal and a reference signal. The one-shot circuit provides a configured duration switch control pulse when the comparison signal is asserted. The pulse duration controller controls the configured duration of the switch control pulse (e.g., duration of a pulse on-time or off-time) to affect the switching frequency of the regulator. In addition, frequency jittering and frequency scaling circuitry may be included.

FIG. 1 is a block diagram of an embodiment of regulator 100. Regulator 100 may include regulator controller 110, regulator output circuitry 180, and feedback circuit 190.

Regulator 100 is arranged to provide regulated power signal VOUT from input power signal VIN such that regulated power signal VOUT is maintained at a substantially constant voltage over a range of voltages on input power signal VIN. For example, regulator 100 may be arranged to regulate regulated power signal VOUT to +12 volts, +3.3 volts, +1.8 volts, −5 volts, and/or the like.

In addition, regulator 100 is arranged to provide relatively fast transient response regulation of regulated power signal VOUT. In one embodiment, switch controller 120, regulator output circuitry 180, and feedback circuit 190 are arranged to control regulation of a current or voltage of regulated power signal VOUT, as part of a relatively fast control loop. Also, in one embodiment, pulse duration controller 130 and regulator output circuitry 180 are arranged to control the switching frequency of regulator output circuitry 180, as part of another control loop. In one embodiment, regulator 100 is also arranged such that a switching frequency of regulator output circuitry 180 is substantially constant. Likewise, EMI design considerations may be simplified for systems employing regulator 100.

Regulator controller 110 is arranged to provide switch control signal SCTL to control the switching of regulator output circuitry 180 based, at least in part, on reference signal VREF, feedback signal VFB, and reference frequency signal FREF. Regulator controller 110 may include switch controller 120 and pulse duration controller 130.

Switch controller 120 is arranged to receive reference signal VREF, feedback signal VFB, and signal DURATION. Switch controller 120 is further arranged to provide switch control signal SCTL based, at least in part, on these received signals.

In one embodiment, reference signal VREF is a substantially constant voltage that may be provided by either an internal or external reference source. For example, reference signal VREF may be a reference voltage that is provided by a band-gap reference circuit. In other embodiments, circuits such as linear regulators, Zener diodes, digital-to-analog converters, voltage controlled current sources, current amplifiers, current regulators, and/or the like, may be suitably employed to provide reference signal VREF. In another embodiment, reference signal VREF may be a reference current that is provided by a current mirror and/or other circuitry. In one embodiment, reference signal VREF may be adjusted to change a value of output signal VOUT.

In one embodiment, feedback signal VFB is received from feedback circuit 190 and is based, at least in part, on regulated power signal VOUT.

In one embodiment, switch controller 120 includes a one-shot based switch control circuit. For example, switch controller 120 may be arranged to provide switch control pulses of configured durations based, at least in part, on a comparison of feedback signal VFB to reference signal VREF. In one embodiment, the duration (e.g., on-time or off-time) of such switch control pulses is based, at least in part, on a value of signal DURATION.

Pulse duration controller 130 is arranged to receive reference frequency signal FREF and switch control signal SCTL. In one embodiment, pulse duration controller 130 is arranged to receive switch control signal SCTL as a frequency sense signal. Pulse duration controller 130 is further arranged to provide signal DURATION based, at least in part, on a switching frequency associated with regulator 100. In one embodiment, pulse duration controller 130 provides signal DURATION based, at least in part, on a frequency or a period duration of switch control signal SCTL. This switching frequency may, for example, be determined by a comparison of the switching frequency on switch control signal SCTL to a value of reference frequency signal FREF.

In one embodiment, reference frequency signal FREF is a substantially constant voltage or current that represents a switching frequency. In another embodiment, reference frequency signal FREF may be a reference clock signal. Reference frequency signal FREF may be provided by any suitable internal or external reference source. For example, a band-gap reference, current mirror circuits, crystal oscillator, voltage controlled oscillator (VCO) circuit, phase lock loop (PLL) circuit, and/or the like, may be suitably employed to provide reference frequency signal FREF.

In other embodiments, pulse duration controller 130 may be arranged to receive frequency sense signals other than switch control signal SCTL or to determine the switching frequency associated with regulator 100 in other ways. For example, it may be arranged to determine the switching frequency by monitoring a switch driver output, by monitoring a ripple on regulated power signal VOUT, by sensing a current through regulator output circuitry 180, by monitoring a ripple on feedback signal VFB, by monitoring a switch node of regulator output circuitry 180, and/or the like. Further, these and other examples of ways to determine the switching frequency associated with regulator 100 may be employed to also determine a frequency associated with switch control signal SCTL. These and other variations are within the spirit and scope of the invention.

Regulator output circuitry 180 is arranged to receive switch control signal SCTL and input power signal VIN. Regulator output circuitry 180 is further arranged to provide regulated power signal VOUT from input power signal VIN based, at least in part, on these received signals.

In one embodiment, regulator output circuitry 180 includes switching buck regulation circuitry. However, regulator output circuitry 180 may be any switched mode regulation circuitry. For instance, regulator output circuitry 180 may include boost regulation circuitry, buck-boost regulation circuitry, inverting regulation circuitry, fly-back conversion circuitry, and/or the like. Regulator output circuitry 180 is discussed in further detail with reference to FIG. 4, for certain embodiments.

In one embodiment, regulator output circuitry 180 is coupled between a positive input power supply signal and ground. However, in other embodiments, regulator output circuitry 180 may be coupled between a positive input power supply and a negative input power supply, between ground and a negative power supply, between two positive power supplies, between two negative power supplies, and/or the like.

Feedback circuit 190 is arranged to received regulated power signal VOUT and to provide feedback signal VFB to regulator controller 110. In one embodiment, feedback circuit 190 includes a voltage divider that is arranged to provide feedback signal VFB based, at least in part, on regulated power signal VOUT. In other embodiments, other circuits may be employed instead of, or in conjunction with, a voltage divider. For example, an offset amplifier, a difference amplifier, a voltage follower, a buffer, a RC network, a compensation circuit, and/or the like, may be employed to provide feedback signal VFB based, at least in part, on regulated power signal VOUT and/or other signals. In one embodiment, feedback circuit 190 is omitted and regulated power VOUT is provided to regulator controller 110 as a feedback signal. These and other variations are within the spirit and scope of the invention.

Regulator 100 may be employed to provide power to virtually any electrical load. For example, regulator 100 may supply current to an electronic device or circuit such as a computer, television, mobile device, wireless device, motor, illumination device, and/or the like. These and other applications are within the spirit and scope of the invention.

In at least one embodiment, regulators within the spirit and scope of the invention may differ from the illustrated embodiment. For example, a regulator may be arranged as a current regulator. Likewise, a regulator may be arranged to employ current mode control, voltage mode control, and/or the like. In one embodiment, a regulator is arranged to receive an enable signal, mode control signal, and/or the like, or may include an under-voltage protection circuit; an over-voltage protection circuit, an over-current protection circuit; a temperature sensing circuit; a battery status monitoring circuit;

and/or the like (not shown). These and other variations are within the spirit and scope of the invention.

Figure 2:
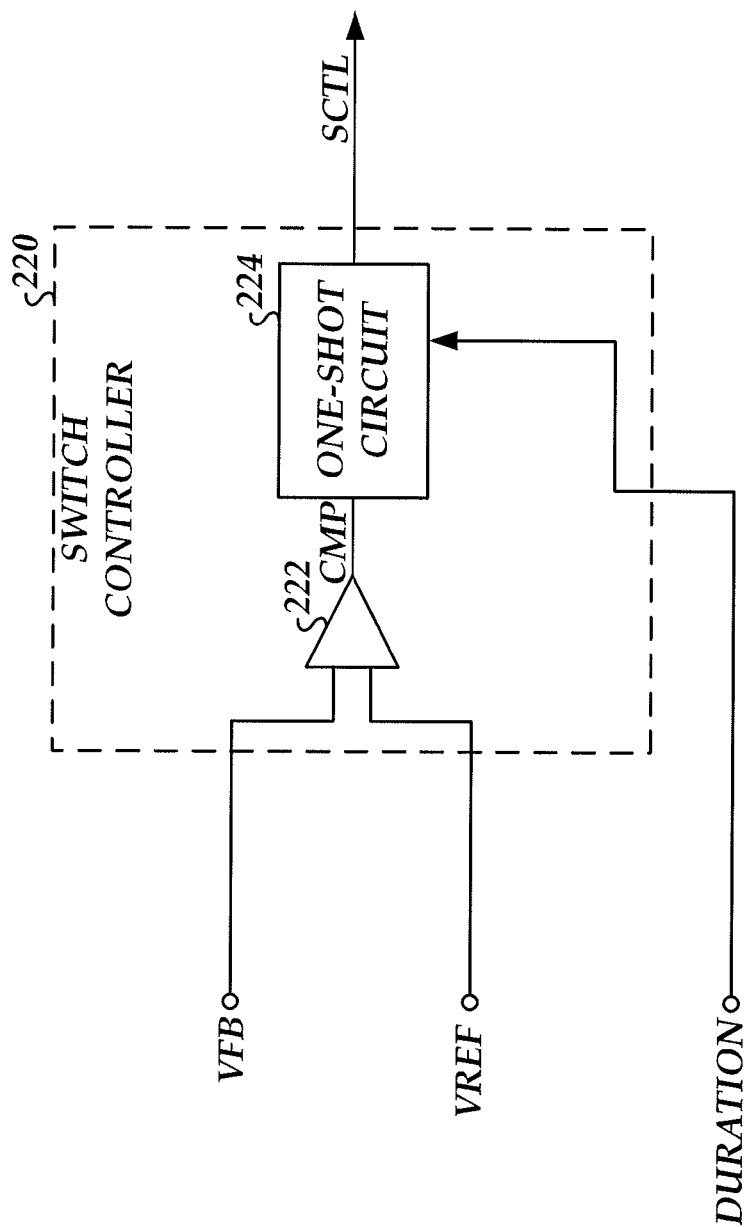
FIG. 2 is a block diagram of an embodiment of the switch controller of FIG. 1 according to aspects of the present invention.

FIG. 2 is a block diagram of an embodiment of switch controller 220. Switch controller 220 may be employed as an embodiment of switch controller 120 of FIG. 1. Switch controller 220 may include comparison circuit 222 and one-shot circuit 224.

Switch controller 220 is arranged to receive feedback signal VFB, reference signal VREF, and signal DURATION. Switch controller 220 is further arranged to provide switch control signal SCTL based, at least in part, on feedback signal VFB, reference signal VREF, and signal DURATION. In the illustrated embodiment, switch controller 220 is arranged as one-shot based regulation control circuitry.

Comparison circuit 222 is arranged to provide comparison signal CMP based, at least in part, on a difference between reference signal VREF and feedback signal VFB. In one embodiment, comparison signal CMP is driven high while reference signal VREF is greater than feedback signal VFB. Likewise, comparison signal CMP is driven low while reference signal VREF is less than feedback signal VFB. Comparison circuit 222 may include a comparator, a differential amplifier, an operational amplifier circuit, and/or the like.

In one embodiment, one-shot circuit 224 is arranged to provide switch control signal SCTL based, at least in part, on comparison signal CMP. In one embodiment, one-shot circuit 224 is arranged such that when comparison signal CMP transitions, switch control signal SCTL is asserted for a configured duration of time and is de-asserted at the end of the configured duration of time.

Switch control signal SCTL and the assertion and de-assertion thereof may be either active high or active low. Also, the configured duration of time may be referred to as the configured duration of the pulse, as the pulse on-time (e.g., active high), or as the pulse off-time (e.g., active low). For example, one-shot circuit 224 may be configured to provide a switch control pulse either following any edge, a rising edge only, falling edge only, and/or the like, on comparison signal CMP. Switch control signal SCTL may be provided as either an active low signal or as an active high signal. One-shot circuit 224 may include digital timer circuitry, analog pulse generation circuitry, and/or the like.

In one embodiment, the configured duration is based, at least in part, on a value of signal DURATION. In one embodiment, the configured duration is proportional to the value of signal DURATION. For example, if digital timer circuitry is employed in one-shot circuit 224, the value of signal DURATION may be proportional to a number of clock cycles during which switch control signal SCTL is asserted. As the configured duration of the output pulse affects the amount of energy transferred through regulation output circuitry (such as regulator output circuitry 180 of FIG. 1), the configured duration in turn affects the duration of time between subsequent switch control pulses. Accordingly, in effect, the configuration duration may be changed to control the switching frequency of the regulator.

Figure 3:
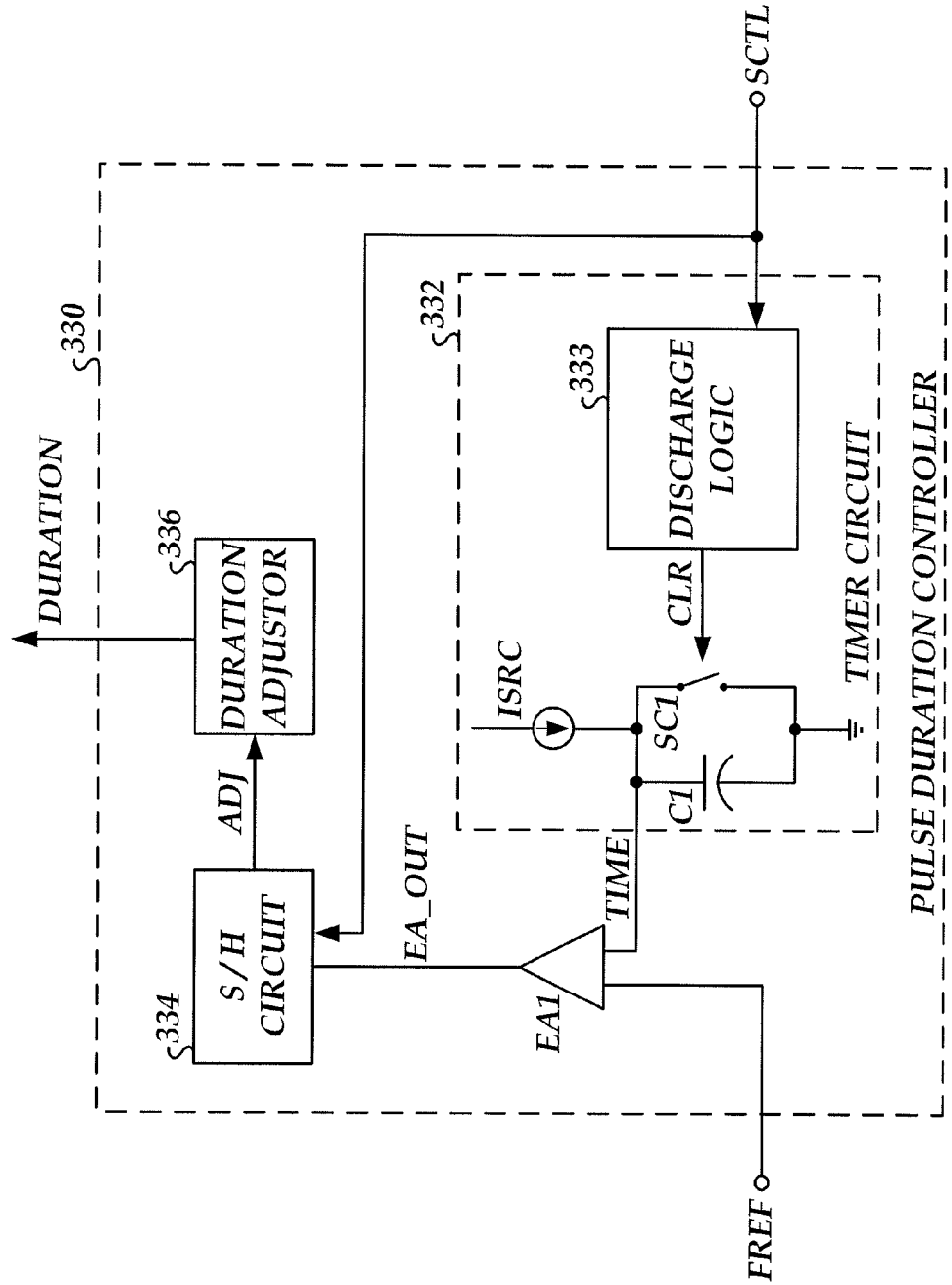
FIG. 3 is a block diagram of an embodiment of the pulse duration controller of FIG. 1 according to aspects of the present invention.

FIG. 3 is a block diagram of an embodiment of pulse duration controller 330. Pulse duration controller 330 may be employed as an embodiment of pulse duration controller 130 of FIG. 1. Pulse duration controller 330 may include timer circuit 332, error amplifier EA1, sample and hold circuit 334, and duration adjustor 336.

In one embodiment, timer circuit 332 includes discharge logic 333, switch SC1, capacitor C1, and current source ISRC. Also, in one embodiment, timer circuit 332 is arranged to measure a duration of a period on, or a frequency of, switch control signal SCTL and to provide signal TIME to error amplifier EA1. In one embodiment, discharge logic 333 may be arranged to provide a discharge pulse on signal CLR following a transition on switch control signal SCTL (e.g., following each rising edge, or following each falling edge) to discharge capacitor C1. Following the end of the discharge pulse, current source ISRC provides a constant current to capacitor C1. Accordingly, the voltage on signal TIME represents the length of time since capacitor C1 was last reset and the voltage on signal TIME immediately prior to discharging capacitor C1 is related to the switching frequency of switch control signal SCTL. In another embodiment, timer circuit 332 includes digital timing circuitry which provides a signal TIME that is proportional to a period on, or a frequency of, switch control signal SCTL.

In one embodiment, discharge logic 333 is a one-shot circuit that is arranged to provide a relatively short duration pulse on signal CLR following each rising edge on switch control signal SCTL. Signal CLR may be provided as either an active low signal or as an active high signal.

In the illustrated embodiment, reference frequency signal FREF is an analog signal that represents a reference frequency and error amplifier EA1 is arranged to compare reference frequency signal FREF to signal TIME to provide error signal EA_OUT. In other embodiments, error amplifier EA1 may be replaced with a difference amplifier circuit, an operational amplifier circuit, an instrumentation amplifier circuit, a comparator, and/or the like.

In one embodiment, sample and hold circuit 334 is arranged to latch the value of error signal EA_OUT, for example, to latch the difference between signal TIME and reference frequency FREF before capacitor C1 is discharged. For example, in one embodiment, sample and hold circuit 334 is arranged to receive switch control signal SCTL, as a clock signal, to control the sampling and holding of signal EA_OUT. Sample and hold circuit 334 is further arranged to provide adjustment signal ADJ to duration adjustor 336. In one embodiment, discharge logic 332 and/or sample and hold circuit 334 includes delay circuitry, timing offset circuitry, and/or the like, to enable sample and hold circuit 334 to latch error signal EA_OUT before capacitor C1 is discharged.

In one embodiment, duration adjustor 336 is arranged to receive adjustment signal ADJ and to provide signal DURATION. In one embodiment, adjustment signal ADJ is provided by sample and hold circuit 334 such that it is proportional to a difference between the switching frequency of regulator 100 of FIG. 1 and the frequency represented by frequency reference signal FREF. Likewise, duration adjustor 336 is arranged to provide signal DURATION based, at least in part, on the value of adjustment signal ADJ and a previous value of signal DURATION. In one embodiment, duration adjustor 336 includes digital logic that adds or subtracts the value of adjustment signal ADJ from the previous value of signal DURATION. In other embodiments, a microcontroller, microprocessor, and/or the like, may also be suitably employed. Duration adjustor 336 may operate synchronously or asynchronously.

In other embodiments, other pulse duration controllers may be suitably employed. For example, digital counters, phase lock loop (PLL) circuitry, microprocessors, microcontrollers, other digital or analog logic, and/or the like, may be employed instead of the illustrated phase duration controller. In addition, such pulse duration controllers may be arranged to receive a clock signal, an analog signal, or a digital signal as reference frequency signal FREF; and/or to provide a clock signal, an analog signal, or an analog signal as signal DURATION. These and other variations are within the spirit and scope of the invention.

Figure 4:
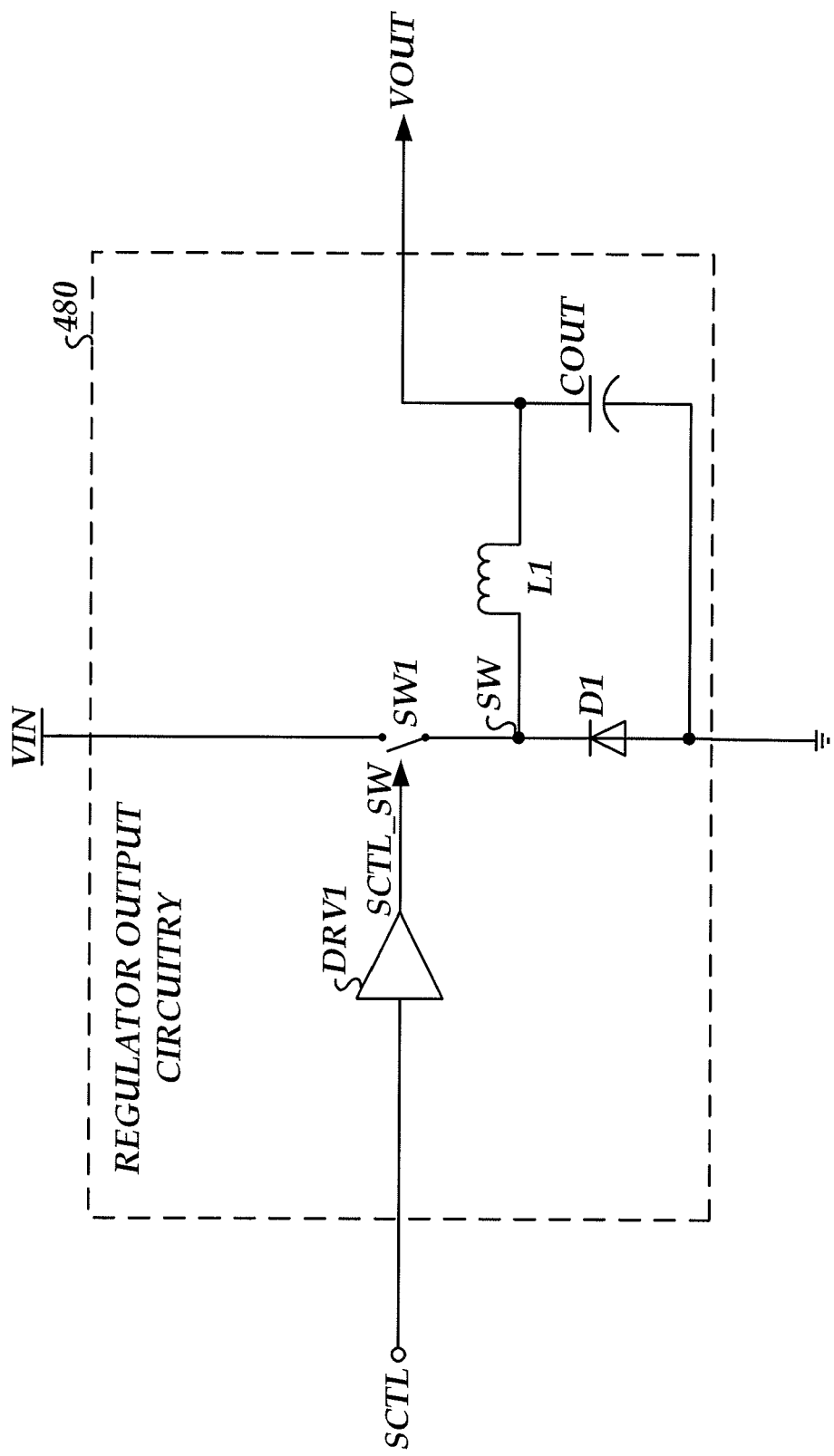
FIG. 4 is a block diagram of an embodiment of the regulator output circuitry of FIG. 1 according to aspects of the present invention.

FIG. 4 is a block diagram of an embodiment of the regulator output circuitry of FIG. 1. Regulator output circuitry 480 may be employed as an embodiment of regulator output circuitry 180 of FIG. 1. Regulator output circuitry 480 may include driver DRV1, switch SW1, diode D1, inductor L1, and output capacitor COUT.

In one embodiment, driver DRV1 is arranged to drive switch SW1 via driver output signal SCTL_SW based on switch control signal SCTL. Driver DRV1 may be any driver type that is suitable to drive the control input of a switch circuit of a regulator. In other embodiments, driver DRV1 may be omitted.

Switch SW1 is arranged to selectively couple input power signal VIN to switch node SW and to provide regulated power signal VOUT based on driver output signal SCTL_SW. In one embodiment, switch SW1 includes an N-channel MOSFET device. However, in other embodiments, switch SW1 may include a P-channel MOSFET device, a BJT transistor, a JFET transistor, other FET devices, and/or the like, instead of an N-channel MOSFET device.

Diode D1 is arranged to rectify the power at node SW to provide regulated power signal VOUT. In other embodiments, regulator output circuitry may be synchronously rectified.

Inductor L1 and capacitor COUT may be of any suitable types or values for use with power regulation.

Although regulator output circuitry 480 is described as a switching buck regulation circuit, other switching regulation circuits may be suitably employed. For instance, boost regulation circuitry, buck-boost regulation circuitry, inverting regulation circuitry, fly-back conversion circuitry, and/or the like, may be suitably employed instead of buck regulation circuitry. Likewise, other embodiments of regulator output circuitry may include input capacitors, transformers, other capacitors, other switches, other diodes, and/or the like (not shown). Moreover, any number of switch control signals may be provided. For example, a synchronously rectified buck-boost regulator output circuitry may receive four switch control signals (not shown). These and other variations are within the spirit and scope of the invention.

Figure 5:
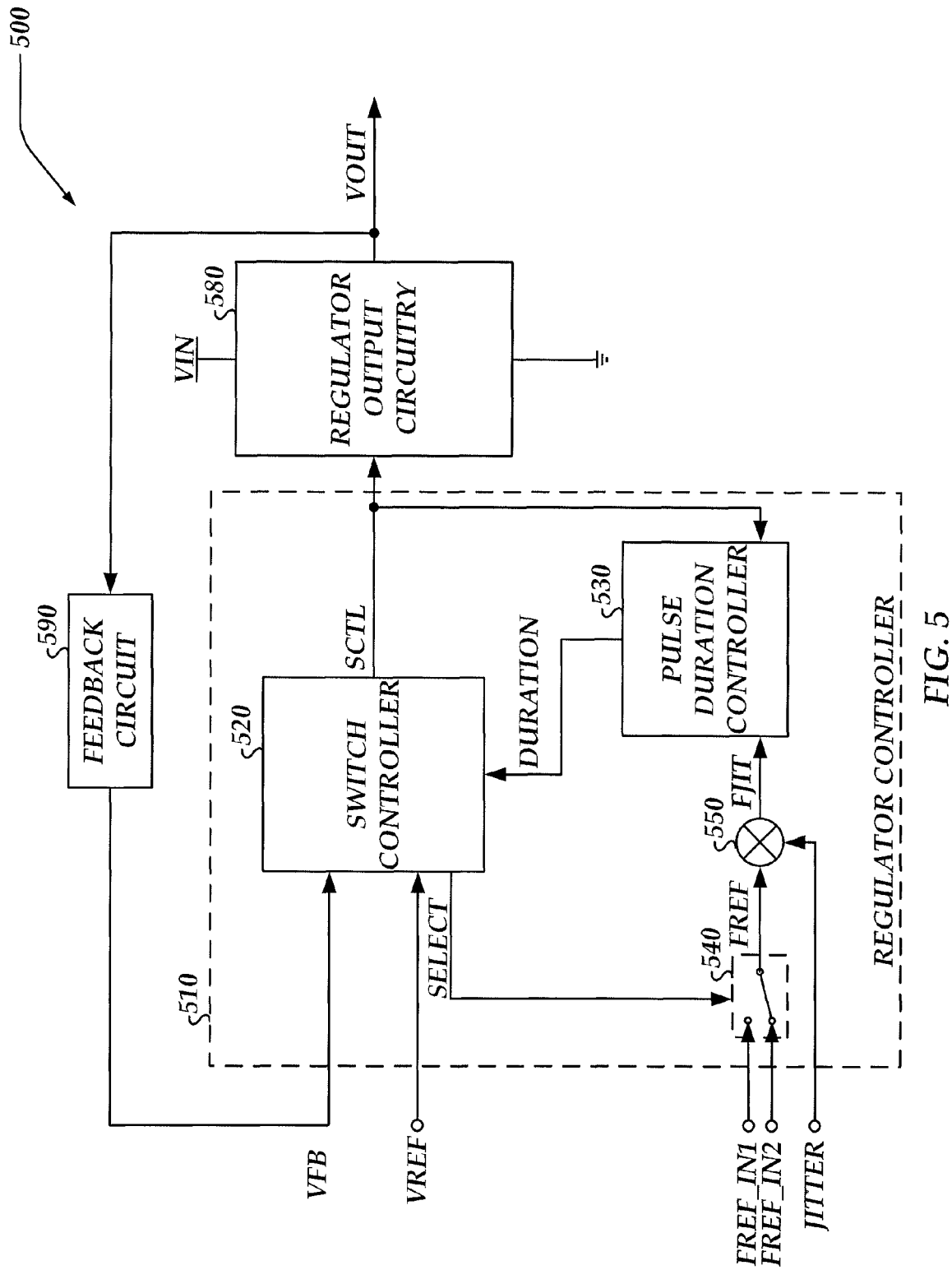
FIG. 5 is a block diagram of another embodiment of a regulator according to aspects of the present invention.

FIG. 5 is a block diagram of an embodiment of regulator 500. Regulator 500 may be employed as an embodiment of regulator 100 of FIG. 1. Regulator 500 may include regulator controller 510, regulator output circuitry 580, and feedback circuit 590.

Regulator controller 510 is arranged to provide switch control signal SCTL to control the switching of regulator output circuitry 580. Regulator controller 510 may include switch controller 520, pulse duration controller 530, frequency selector 540, and jitter circuit 550.

Switch controller 520 and pulse duration controller 530 may be employed as respective embodiments of switch controller 120 and pulse duration controller 130 of FIG. 1.

Frequency selector 540 is arranged to select between input reference frequency signal FREF_IN1 and input reference frequency signal FREF_IN2 to provide reference frequency signal FREF. Although frequency selector 540 is described as receiving two input reference frequencies, other embodiments may be arranged to receive any number of input reference frequencies.

In one embodiment, frequency selector 540 is arranged to select the switching frequency about which regulator 500 operates. For example, during low load current draw operation, frequency selector 540 may decrease the switching frequency of regulator 500 such that a minimum on-time or off-time for the switch control pulses is maintained. Likewise, during high load current draw operation, frequency selector 540 may increase the switching frequency of regulator 500 such that a maximum on-time or off-time for the switch control pulses is maintained. In one embodiment, low load current draw or high load current draw may be detected by current sensing circuits, by monitoring the output of the pulse duration controller, and/or the like. Digital and/or analog logic, and/or other circuitry may be employed.

In one embodiment, the input reference frequency signals are provided such that the frequency of, represented by, or associated with input reference frequency signal FREF_IN1 is an integer multiple of, or evenly divisible by, the frequency of, represented by, or associated with input reference frequency signal FREF_IN2. For example, use of integer multiple input reference frequencies may enable the harmonics of generated switching noise to be at the same frequencies. Further, this may enable simplify EMI management of regulator 500. However, in other embodiments, the input reference frequency signals may be provided such that the frequency of, represented by, or associated with input reference frequency signal FREF_IN1 is not an integer multiple of, or evenly divisible by, the frequency of, represented by, or associated with input reference frequency signal FREF_IN2.

Further, in other embodiments, frequency selector circuitry may be arranged differently. For example, same or similar functionality may be provided by scaling (e.g., multiplying or dividing) signal DURATION, an error signal, a frequency sense signal and/or the like. Also, such scaling may include time scaling and/or amplitude scaling, as appropriate for each frequency selector and pulse duration selector embodiment. For example, time scaling may include scaling the frequency of a signal (e.g., doubling the frequency).

Jitter circuit 550 is arranged to sum signal JITTER with reference signal FREF to provide signal FJIT to pulse duration controller 530. In one embodiment, jitter circuit 550 enables the switching noise of regulator 500 to be spread over a range of frequencies. For example, it may reduce the peak magnitude of the switching noise by spreading the switching noise over a range of frequencies. Further, this may enable reduction of the EMI generated by regulator 500.

The magnitude and/or spectral range of signal JITTER may be set to any suitable values. For example, these values may be selected by balancing frequency stabilization and EMI requirements. Moreover, signal JITTER may include Gaussian components, pseudo-random components, predetermined components, and/or the like, and combinations thereof. Signal JITTER may be generated by internal circuitry (not shown) or provided by a user. If internally generated, the magnitude and spectral range of signal JITTER may be run-time changeable, provided at a system startup, fixed during manufacturing, and/or the like. Optionally, jitter circuit 550 may be run-time enabled, disabled, bypassed, and/or the like.

In other embodiments, jitter circuit 550 may be arranged to provide jitter to a different signal or in a different way. For example, signal JITTER may be added, subtracted, scaled into, and/or the like, into signal DURATION, switch control signal SCTL, feedback signal VFB, reference signal VREF, and/or the like. Likewise, signal JITTER may be added, subtracted, scaled into, and/or the like, into error signal EA_OUT or adjustment signal ADJ of FIG. 3, and/or the like. These and other embodiments are within the spirit and scope of the invention.

Regulator output circuitry 580 and feedback circuit 590 may be employed as respective embodiments of regulator output circuitry 180 and feedback circuit 190 of FIG. 1.

Although regulator 500 is described as having both frequency selector 540 and jitter circuit 550, in other embodiments, one or both of these circuits may be omitted.

Figure 6:
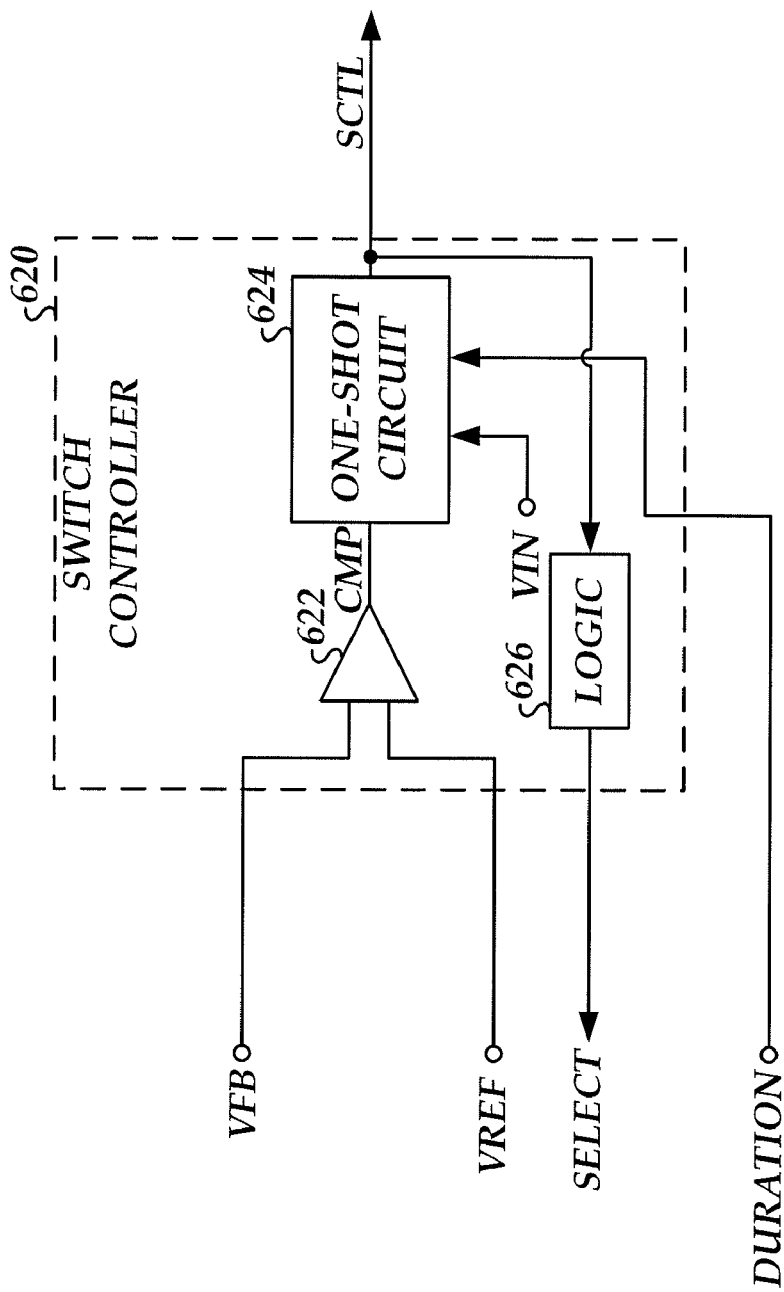
FIG. 6 is a block diagram of an embodiment of the switch controller of FIG. 5 according to aspects of the present invention.

FIG. 6 is a block diagram of an embodiment of switch controller 620. Switch controller 620 may be employed as an embodiment of switch controller 120 of FIG. 1. Switch controller 620 may include comparison circuit 622, one-shot circuit 624, and logic 626.

Switch controller 620 is arranged to receive feedback signal VFB, reference signal VREF, and signal DURATION. Switch controller 620 is also arranged to provide switch control signal SCTL based, at least in part, on these received signals. Further, switch controller 620 is arranged to provide signal SELECT based on, for example, a frequency or period duration of switch control signal SCTL.

Comparison circuit 622 may be employed as an embodiment of comparison circuit 222 of FIG. 2.

One-shot circuit 624 may be employed as an embodiment of one-shot circuit 224 of FIG. 2. In addition, one-shot circuit 624 is arranged such that the configured duration is further adjusted based, at least in part, on input power source VIN. For example, in one embodiment, the configured duration is additionally adjusted based on the magnitude of the voltage of input power source VIN. In other embodiments, the configured duration is further adjusted based on a value of a configuration resistor, a potentiometer setting, a digital to analog converter output, a timer circuit output, a clock signal, a register setting, and/or the like (not shown).

In one embodiment, logic circuit 626 is arranged to provide signal SELECT to a frequency selector (such as frequency selector 550 of FIG. 5) based on, for example, a frequency of switch control signal SCTL, a load current draw, and/or the like. In one embodiment, logic circuit 626 provides signal SELECT based, at least in part, on measuring a duty cycle of switch control signal SCTL and comparing this measured duty cycle to threshold values. Logic 626 may include analog logic, digital logic, a microprocessor, a microcontroller, and/or the like. In other embodiments, other logic is employed instead of logic 626 to provide signal SELECT. For example, such other logic may be part of the pulse duration controller, part of the regulator output circuitry, and/or the like. Further, signal SELECT may be provided by a user input, by an external component, and/or the like. These and other variations are within the spirit and scope of the invention.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent of the United States is:

1. A circuit for regulating power, comprising:
    a regulator controller that is arranged to provide a switch control signal, wherein the regulator controller includes:
        a comparison circuit that is arranged to provide a comparison signal that is based, at least in part, on a comparison of a reference signal to a feedback signal;
        a one-shot circuit that is arranged to receive the comparison signal and to provide a one-shot signal, and is arranged such that if the comparison signal is asserted, the one-shot signal is asserted for a configured duration and is de-asserted at the end of the configured duration, wherein the switch control signal is based, at least in part, on the one-shot signal; and
        a pulse duration controller that is arranged to adjust the configured duration based, at least in part, on a frequency sense signal, wherein the frequency sense signal is based, at least in part, on a frequency associated with the switch control signal, wherein the pulse duration controller includes:
            a timer circuit that is arranged to provide a time signal that is proportional to the frequency associated with the switch control signal;
            an error amplifier that is arranged to provide an error signal that is based, at least in part, on a difference between the time signal and a reference frequency signal; and
            a duration adjustor that is arranged to provide a first signal to the one-shot circuit such that the first signal is based, at least in part, on summing the error signal with a previous value of the first signal.

2. The circuit of claim 1, wherein the frequency sense signal is based, at least in part, on at least one of the one-shot signal, the switch control signal, the feedback signal, or a regulated power signal.

3. The circuit of claim 1, wherein the comparison circuit includes:
    a comparator having at least a first input that is arranged to receive the reference signal, a second input that is arranged to receive the feedback signal, and an output that is arranged to provide the comparison signal.

4. The circuit of claim 1, wherein the frequency sense signal is the switch control signal, wherein the switch control signal is the one-shot signal, wherein the switch control signal is at least one of an active high or an active low signal, and wherein the pulse duration controller is arranged to maintain the frequency associated with the switch control signal at a substantially constant value.

5. The circuit of claim 1, wherein the pulse duration controller and the one-shot circuit are arranged to adjust the configured duration such that the frequency associated with the switch control signal is approximately maintained at a predetermined value.

6. The circuit of claim 1, wherein the pulse duration controller is arranged to provide a first signal to the one-shot circuit that is based, at least in part, on a difference between the frequency sense signal and a reference frequency signal, and wherein the one-shot circuit is arranged such that the configured duration is based, at least in part, on the first signal.

7. The circuit of claim 6, wherein the pulse duration controller and the one-shot circuit are arranged such that the configured duration is proportional to a value of the first signal.

8. The circuit of claim 6, further comprising:
    a frequency selector that is arranged to select the reference frequency signal from a plurality of input reference frequency signals.

9. The circuit of claim 6, further comprising:
    a frequency selector that is arranged to scale the frequency associated with the switch control signal by scaling at least one of the reference frequency signal, the first signal, or the frequency sense signal.

10. The circuit of claim 1, further comprising:
    a jitter circuit that is arranged to jitter the frequency associated with the switch control signal.

11. The circuit of claim 10, wherein the jitter circuit is arranged to combine a jitter signal with at least one of a first signal that is based, at least in part, on a difference between the frequency sense signal and the reference frequency signal; the frequency sense signal; the switch control signal; the one-shot signal; or a reference frequency signal.

12. The circuit of claim 1, further comprising:
regulator output circuitry that is arranged to receive an input power signal and the switch control signal, and is further arranged to provide a regulated power signal based, at least in part, on the switch control signal.

13. The circuit of claim 12, wherein the comparator, the one-shot circuit, and the regulator output circuitry are arranged to control regulation of a current or voltage of the regulated power signal, as part of a first control loop; and wherein the pulse duration controller, the one-shot circuit, and the regulator output circuitry are arranged to substantially maintain the frequency associated with the switch control signal without substantially changing a duty cycle associated with the switch control signal, as part of a second control loop.

14. The circuit of claim 12, wherein the regulator output circuitry includes at least one of buck, boost, or buck-boost regulation circuitry.

15. The circuit of claim 12, wherein the frequency associated with the switch control signal is further associated with a switching frequency of the switch circuit, and wherein the feedback signal is based, at least in part, on the regulated power signal.

16. A method for regulating power, comprising:
receiving a feedback signal and a reference signal, wherein the feedback signal is based, at least in part, on a output power signal;
providing a comparison signal based, at least in part, on a comparison of the feedback signal to the reference signal;
employing a one-shot circuit to provide a one-shot signal such that if the comparison signal is asserted, the one-shot signal is asserted for a configured duration and is de-asserted at the end of the configured duration;
adjusting the configured duration based, at least in part, on a frequency sense signal, wherein the frequency sense signal is based, at least in part, on a frequency associated with the one-shot signal;
providing a switch control signal that is based, at least in part, on the one-shot signal; and
employing the switch control signal to regulate the regulated power signal, wherein adjusting the configured duration includes:
providing a time signal that is proportional to the frequency associated with the one-shot signal;
providing an error signal that is based, at least in part, on a difference between the time signal and a reference frequency signal; and
providing a first signal to the one-shot circuit such that the first signal is based, at least in part, on summing the error signal with a previous value of the first signal.

17. The method of claim 16 further comprising:
selecting a reference frequency signal from a plurality of input reference frequency signals, wherein the adjusting the configured duration is based, at least in part, on comparing a difference between the frequency sense signal and the reference frequency signal.

18. The method of claim 16, further comprising:
scaling the frequency associated with the switch control signal by scaling at least one of a reference frequency signal, the first signal, or the frequency sense signal, wherein the adjusting the configured duration is based, at least in part, on comparing a difference between the frequency sense signal and the reference frequency signal.

19. The method of claim 16, further comprising:
combining a jitter signal with at least one of the frequency sense signal; the switch control signal; a reference frequency signal; or a first signal that is based, at least in part, on a difference between the frequency sense signal and the reference frequency signal.

\* \* \* \* \*

UNITED STATES PATENT AND TRADEMARK OFFICE
CERTIFICATE OF CORRECTION

PATENT NO. : 7,782,036 B1  
APPLICATION NO. : 11/970144  
DATED : August 24, 2010  
INVENTOR(S) : Lik-Kin Wong et al.

It is certified that error appears in the above-identified patent and that said Letters Patent is hereby corrected as shown below:

In column 5, line 51-52, delete "regulator" and insert -- regulation --, therefor.

Signed and Sealed this
Twenty-sixth Day of April, 2011

David J. Kappos
*Director of the United States Patent and Trademark Office*